(12) United States Patent
Tolk et al.

(10) Patent No.: US 12,341,173 B2
(45) Date of Patent: Jun. 24, 2025

(54) METHOD FOR PRODUCING A BATTERY ARRANGEMENT

(71) Applicant: Atlas Copco IAS GmbH, Bretten (DE)

(72) Inventors: Marten Tolk, Bruchsal (DE); Udo Moessner, Ispringen (DE)

(73) Assignee: Atlas Copco IAS GmbH, Bretten (DE)

( * ) Notice: Subject to any disclaimer, the term of this patent is extended or adjusted under 35 U.S.C. 154(b) by 574 days.

(21) Appl. No.: 17/603,641

(22) PCT Filed: Mar. 19, 2020

(86) PCT No.: PCT/EP2020/057571
§ 371 (c)(1),
(2) Date: Oct. 14, 2021

(87) PCT Pub. No.: WO2020/212066
PCT Pub. Date: Oct. 22, 2020

(65) Prior Publication Data
US 2022/0238935 A1    Jul. 28, 2022

(30) Foreign Application Priority Data
Apr. 15, 2019   (DE) .................... 10 2019 109 905.6

(51) Int. Cl.
*H01M 10/653* (2014.01)
*H01M 10/04* (2006.01)
(Continued)

(52) U.S. Cl.
CPC ......... *H01M 10/653* (2015.04); *H01M 10/04* (2013.01); *H01M 10/613* (2015.04);
(Continued)

(58) Field of Classification Search
CPC .. H01M 10/04; H01M 10/613; H01M 10/653; H01M 2220/20; H01M 50/202; H01M 50/209
See application file for complete search history.

(56) References Cited

U.S. PATENT DOCUMENTS 5,806,948 A * 9/1998 Rowan, Sr. ............ H04Q 1/112
180/68.5
10,109,901 B2  10/2018 Rhodes et al.
(Continued)

FOREIGN PATENT DOCUMENTS

CN         109256511 A    1/2019
DE   10 2011 076 578 A1   11/2012
(Continued)

OTHER PUBLICATIONS

English translation of International Preliminary Report on Patentability in PCT/EP2020/057571, dated Oct. 21, 2021.
(Continued)

*Primary Examiner* — Minh N Trinh
(74) *Attorney, Agent, or Firm* — Collard & Roe, P.C.

(57) ABSTRACT

A method produces a battery arrangement which has a battery tray having a tray bottom and a battery received in the battery tray, wherein the battery lies on the battery tray at support points spanning a support plane and wherein, before the battery is inserted into the battery tray, a thermal compound is applied to the tray bottom and/or to the battery bottom in order to fill, at least in part, a gap between a battery bottom facing the tray bottom and the tray bottom. Before the thermal compound is applied, a distance between the tray bottom and the support plane is determined at least at first measurement points and the thermal compound is applied to the tray bottom and/or the battery bottom in a
(Continued)

quantity which is dependent on the determined distances between the tray bottom and the support plane.

14 Claims, 3 Drawing Sheets

(51) Int. Cl.
    *H01M 10/613*      (2014.01)
    *H01M 50/202*      (2021.01)
    *H01M 50/209*      (2021.01)

(52) U.S. Cl.
    CPC ....... *H01M 50/202* (2021.01); *H01M 50/209* (2021.01); *H01M 2220/20* (2013.01)

(56) References Cited

U.S. PATENT DOCUMENTS

| | | |
|---|---|---|
| 10,559,793 B2 | 2/2020 | Smith |
| 2021/0135313 A1 | 5/2021 | Simon et al. |
| 2022/0238935 A1* | 7/2022 | Tolk ..................... H01M 10/04 |
| 2022/0393282 A1* | 12/2022 | Wakita .................. H01M 50/24 |

FOREIGN PATENT DOCUMENTS

| | | |
|---|---|---|
| DE | 10 2013 007 252 B3 | 8/2014 |
| DE | 10 2017 116 420 A1 | 1/2018 |
| DE | 10 2017 204 412 A1 | 9/2018 |
| DE | 10 2018 005 234 A1 | 1/2019 |
| DE | 20 2019 101 971 U1 | 4/2019 |
| DE | 10 2018 208 070 A1 | 11/2019 |
| DE | 10 2019 112 998 A1 | 11/2019 |
| EP | 2 104 121 A1 | 9/2009 |
| JP | 2017076490 A | 4/2017 |
| WO | 2020/165012 A1 | 8/2020 |

OTHER PUBLICATIONS

International Search Report in PCT/EP2020/057571, mailed Aug. 4, 2020.

German Search Report in DE 10 2019 109 905.6, dated Dec. 20, 2019, with English translation of relevant parts.

* cited by examiner

METHOD FOR PRODUCING A BATTERY ARRANGEMENT

CROSS REFERENCE TO RELATED APPLICATIONS

This application is the National Stage of PCT/EP2020/057571 filed on Mar. 19, 2020, which claims priority under 35 U.S.C. § 119 of German Application No. 10 2019 109 905.6 filed on Apr. 15, 2019, the disclosure of which is incorporated by reference. The international application under PCT article 21(2) was not published in English.

BACKGROUND OF THE INVENTION

1. Field of the Invention

The invention relates to a method for the production of a battery arrangement.

2. Description of the Related Art

Batteries for electrically operated motor vehicles must store large quantities of energy and be capable of being charged in short time. In particular, the battery becomes hot during charging and must often be cooled. For this purpose, a cooler for removing the heat from the battery tray is attached to the battery tray that accommodates the battery. An efficient cooling of the battery then requires that the battery and the battery tray be thermally coupled with one another. For this purpose, an empty space between the battery and the battery tray is filled with a heat-conducting paste that conducts heat very well and that removes the heat generated in the battery to the tray, from where it is removed into the cooler. In order to achieve the best possible heat conduction, the gap between the battery bottom and the tray bottom must be filled over the largest possible area with a layer of the heat-conducting paste that extends from the battery bottom to the tray bottom. If too little heat-conducting paste is applied, the heat conduction is insufficient. However, the application of a too-large quantity of heat-conducting paste is likewise disadvantageous, since the heat-conducting paste is very expensive. The definition of the quantity of heat-conducting paste to be applied is additionally made difficult by the fact that the tray bottom is not ideally smooth and is subject to fabrication tolerances. The battery bottom may also exhibit irregularities due to fabrication tolerances.

A method of the type mentioned in the introduction is known from DE 10 2017 204 412 A1. In that method, more filling material than necessary for filling the gap is applied on the tray bottom, in order to guarantee complete wetting of the battery bottom. This has the consequence that excess material must be displaced during insertion of the battery. From DE 10 2018 005 234 A1, a method for production of a battery arrangement is known in which the height of the gap between the tray bottom and the battery bottom is determined indirectly via a measurement of the height of the individual battery cells. DE 10 2013 007 252 B3 teaches a similar solution. The method described there provides that heat-conducting paste is applied on the undersides of energy reservoirs while these bear with their top sides on an aligning surface. However, the aligning surface does not have any relationship with the tray bottom.

SUMMARY OF THE INVENTION

It is therefore the task of the invention to further develop a method of the type mentioned in the introduction in such a way that the application of heat-conducting paste is improved.

This task is accomplished by a method having the features according to one aspect of the invention. Advantageous further developments of the invention are discussed below. An apparatus having the features according to another aspect of the invention is preferably used for implementation of the method.

The invention is based on the idea of scanning the tray bottom before the application of the heat-conducting paste and measuring, at least at several first measurement points, the distance between the tray bottom and a support plane spanned by support points at which the battery bears on the battery tray. These support points and thus this support plane are assumed to be predetermined. If the battery bottom is assumed to be an ideal planar surface, the width of the gap between the battery bottom and the tray bottom is determined by the distance, measured at as many first measurement points as possible, of the tray bottom to the support plane. The application of the heat-conducting paste then takes place in dependence on the determined distances between the tray bottom and the support plane, so that a more accurate dosing of the heat-conducting paste is possible. The heat-conducting paste is preferably applied on the tray bottom. It is also possible, however, to apply the heat-conducting paste on the battery bottom and to insert the battery together with applied heat-conducting paste into the battery tray. A partial application on the tray bottom and on the battery bottom respectively is also conceivable.

According to an advantageous further development of the invention, a distance between the battery bottom and the support plane is also measured at least at several second measurement points before the application of the heat-conducting paste, and the heat-conducting paste is applied on the tray bottom in a quantity that is dependent on the measured distances between the battery bottom and the support surface. In this way, allowance can also be made for fabrication-related irregularities of the battery bottom and the applied quantity of heat-conducting paste can be adapted to these irregularities. In this way it is possible to assign, to each first measurement point after insertion of the battery into the battery tray, a second measurement point located perpendicularly above it. In the regions between the first and the second measurement points, the heat-conducting paste can then be applied with a height that, after insertion of the battery into the battery tray and if necessary after the material has been pressed flat, corresponds to the distance between the respective first and the second measurement point, when this is located perpendicularly above the first measurement point, or to an approximate distance, determined by interpolation, for example, between the respective first measurement point and a point located perpendicularly above it on the battery bottom.

According to one embodiment of the method, a volume of the gap is calculated at least approximately by means of the first and if necessary by means of the second measurement points, and the heat-conducting paste is applied on the tray bottom in a quantity whose volume corresponds to the volume of the gap. In addition, it is possible in this way to allow for a change in volume of the heat-conducting paste due to a drying or curing process.

The heat-conducting paste can be applied in flat manner and cover the tray bottom or the battery bottom completely or almost completely. However, it is preferred that the heat-conducting paste be applied in the form of at least one material bead, wherein the at least one material bead does not cover the entire tray bottom or the entire battery bottom, and that the at least one material bead is pressed flat between the tray bottom and the battery bottom for filling of the gap during insertion of the battery into the battery tray. This makes use of the fact that the heat-conducting paste is viscous at least for a limited time after the application. The pressing flat of the at least one material bead ensures a filling of the gap as uniformly as possible and a largely flat covering of the tray bottom or of the battery bottom with the heat-conducting paste. In order to improve the flat covering with the heat-conducting paste, the at least one material bead is expediently applied in the region of the corners of the tray bottom or of the battery bottom with a larger cross section than in the middle. The heat-conducting paste may be applied in the form of a wavy or zig-zag material bead or in the form of short material beads, wherein the latter may be shortened to the form of dots. It is also possible, however, to apply the heat-conducting paste in the form of several material beads extending parallel to one another, wherein the cross section of the material bead preferably increases and/or decreases in a direction perpendicular to its longitudinal extent. For example, a thicker material bead may be applied in the middle, where its material is pressed outwardly during insertion of the battery into the battery tray. It is also possible, however, to apply a material bead with large cross section on a rim along the edge bounding the tray bottom, while material beads with smaller cross section are applied parallel to this, wherein the cross section preferably decreases in a direction away from the first-mentioned material bead. In addition, it is possible for the cross section of the material beads to increase and/or decrease in the direction of their longitudinal extent, for example to decrease steadily or to increase at first up to a maximum and then to decrease. This is advantageous in particular when the battery is inserted obliquely into the battery tray, in other words with an acute angle between the battery bottom and the tray bottom, wherein the battery is inserted in such a way that the battery bottom is first placed in the region of the largest material cross section and the material is displaced toward the smaller material cross sections. A combination of various bead geometries is also possible. In addition, the heat-conducting paste can be applied in the form of material drops disposed at a distance relative to one another on the tray bottom and/or the battery bottom. A combination of material beads and material drops is also possible.

Expediently, the battery has at least two shoulders disposed at a distance from one another and provided with support points, on which the battery bears with support surfaces on the underside. The battery can then be positioned in particularly well defined manner relative to the battery tray.

A positionally fixed measuring sensor may be used for measurement of the distance between the tray bottom and the support plane. Expediently, however, a measuring sensor scanning the tray bottom is moved over the tray bottom and along it. The scanning of the tray bottom may take place in a process step carried out separately in time relative to the application of the heat-conducting paste. It is also possible, however, for the measuring sensor to be moved together with an applicator applying the heat-conducting paste onto the tray bottom and to scan the bottom before the application of the heat-conducting paste. The measuring sensor then sends the measured values or the determined distances between the tray bottom and the support plane directly to a control or regulating device, which controls or regulates the application of the heat-conducting paste. The scanning of the tray bottom and the application of the heat-conducting paste then take place in one operation. In the process, it is possible to vary the volume flow of the heat-conducting paste discharged by the applicator in dependence on the determined distances between the tray bottom and the support plane. Expediently, the position of the support plane in space is predetermined or measured and stored, and the measured values of the measuring sensor are referred to the position of the support plane in space.

For checking of the application of the heat-conducting paste, expediently a contour of the heat-conducting paste applied on the tray bottom is surveyed and compared with calculated target values. This permits a subsequent check by means of a comparison of actual and target values, making it possible to estimate whether the appropriate quantity of heat-conducting paste has been applied on the tray bottom.

The application apparatus according to the invention has an application nozzle, which is movable relative to the tray bottom and with which the measuring sensor is preferably connected mechanically, so that it is always moved together with the application nozzle. The measuring sensor scans the tray bottom before the application of the heat-conducting paste and it is set up to determine the distance to the tray bottom. Furthermore, a control or regulating device is a component of the application apparatus. This is set up to determine the distance of at least a number of first measurement points on the tray bottom to the support plane, which is spanned by support points of the battery onto the battery tray. In addition, the control or regulating device controls or regulates the volume flow of the heat-conducting paste discharged by the application nozzle in dependence of the distance, measured at least at the first measurement points, of the tray bottom to the support plane, in order to fill the gap between the battery bottom and the tray bottom as completely as possible and without waste of material.

BRIEF DESCRIPTION OF THE DRAWINGS

The invention will be explained in more detail in the following on the basis of exemplary embodiments schematically illustrated in the drawing, wherein.

DETAILED DESCRIPTION OF THE PREFERRED EMBODIMENTS

Figure 1:
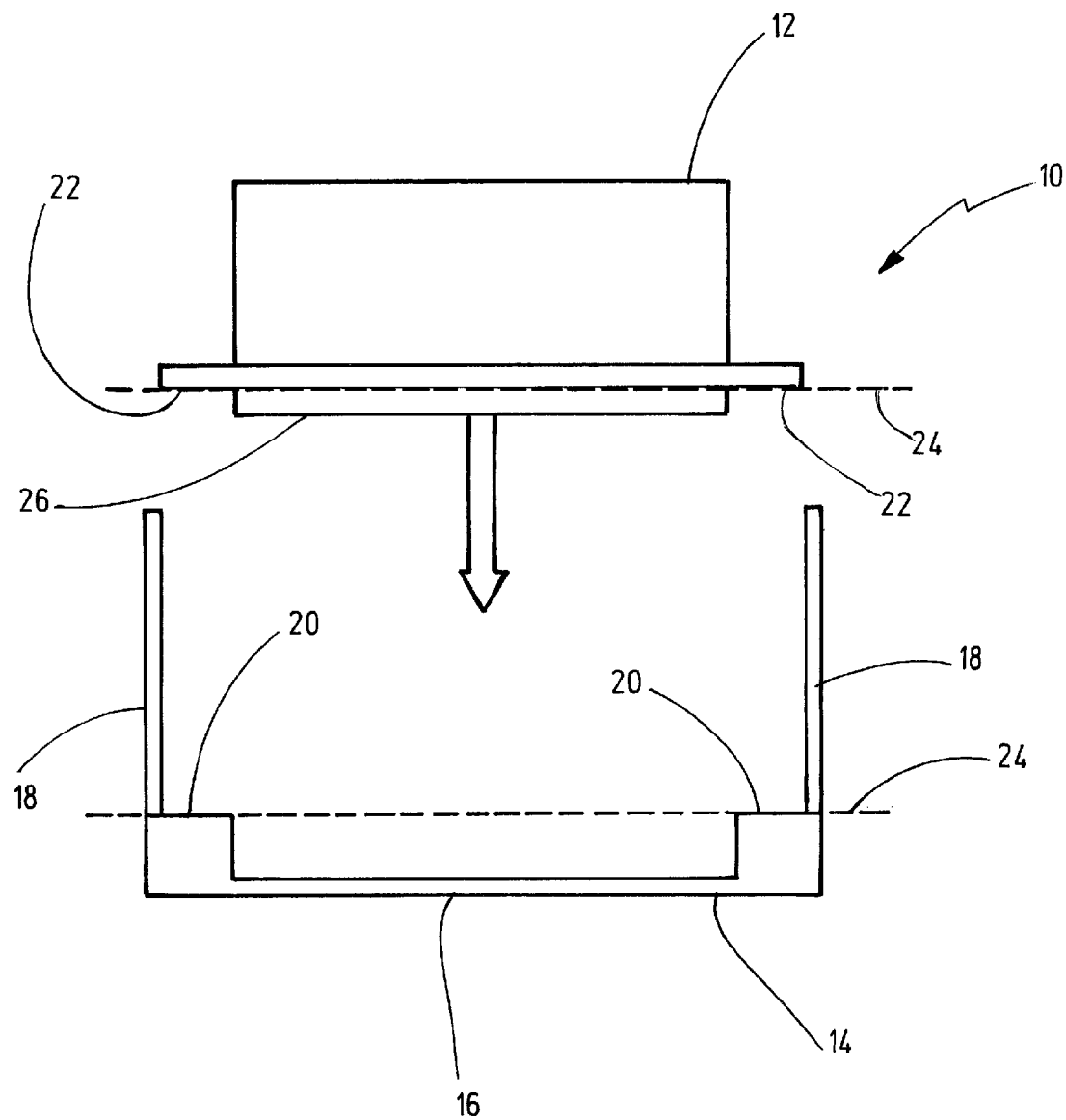
FIG. 1 shows a battery arrangement during assembly in a schematic diagram.

The battery arrangement 10 shown in FIG. 1 is intended for the use as an energy reservoir in an electrically operated motor vehicle. It has a rechargeable battery 12 and an upwardly open battery tray 14 for accommodation of the battery 12. The battery tray 14 has a tray bottom 16 and peripheral tray walls 18 extending vertically from the tray bottom 16. On the tray bottom 16, two shoulders 20, on which the battery 12 in assembled condition bears with support surfaces 22 on the underside, are disposed oppositely at a distance from one another. The support surfaces 22 as well as the shoulders 20 respectively span a reference plane, wherein the reference planes in the assembled condition come together as one support plane 24, which is spanned by the support points at which the battery 12 bears on the battery tray 14.

In order to be able to remove heat from the battery 12 to the battery tray 14 and from this to a cooler, not illustrated, the tray bottom 16 is coated, before the insertion of the battery 12 into the battery tray 14, with a heat-conducting paste, which largely fills a gap remaining between the tray bottom 16 and the battery bottom 26 facing the tray bottom 16 and permits a good heat conduction from the battery bottom 26 to the tray bottom 16. The width of the gap is defined by the distance of the tray bottom 16 to the support plane 24 and by the distance of the battery bottom 26 to the support plane 24, wherein both the tray bottom 16 and the battery bottom 26 are subject to fabrication tolerances and are not ideally planar. For this reason, the tray bottom 16 is scanned by means of a measuring sensor before the application of the heat-conducting paste, and the distance of the tray bottom 16 from the support plane 24 is determined at least at several first measurement points. Furthermore, the battery bottom 26 is also scanned by means of the measuring sensor, and the distance of the battery bottom 26 from the support plane 24 is determined at least at a number of second measurement points. The quantity of the applied heat-conducting paste is then varied in dependence on the determined distances of the tray bottom 16 and of the battery bottom 26 at the first and the second measurement points respectively from the support plane 24, so that the applied quantity of heat-conducting paste fills the gap as completely as possible, without, to the extent possible, applying any excessive quantities of the expensive heat-conducting paste.

Figure 2A:
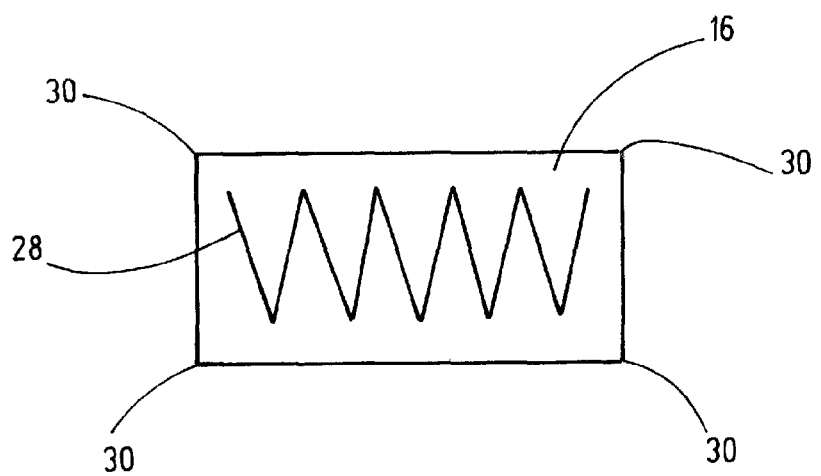
FIG. 2a, 2b, 2c show three variants of a material bead according to a first exemplary embodiment in plan view.
Figure 2B:
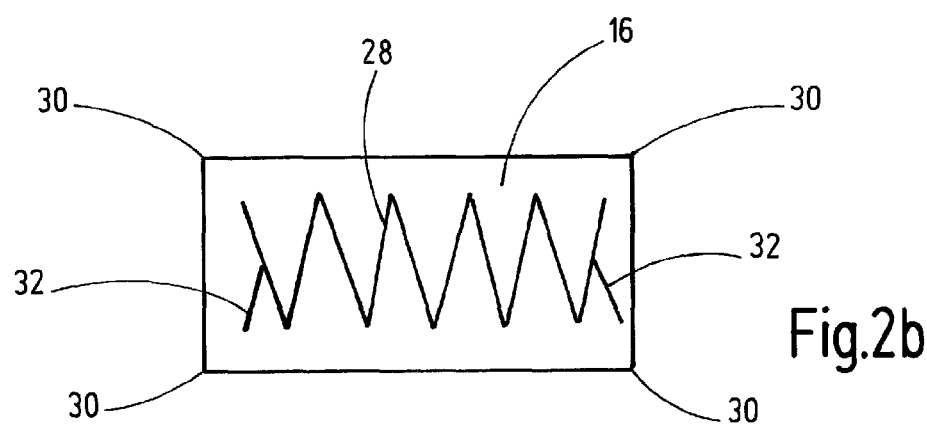
Figure 2C:
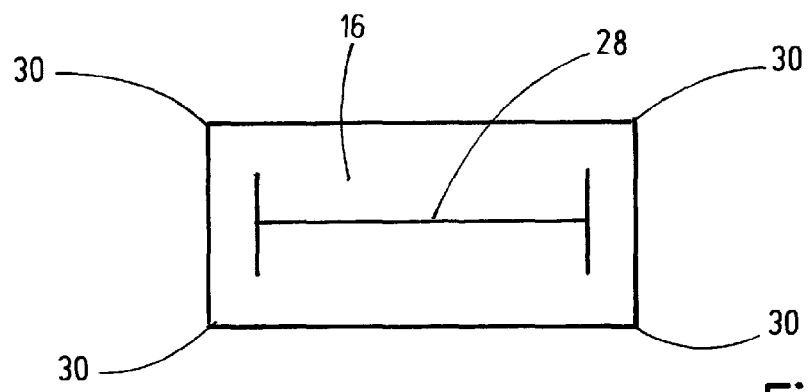

According to FIG. 2a, b, c, the heat-conducting paste is applied on the tray bottom 16 in the form of a material bead 28, which in the variant according to FIG. 2a has a zig-zag shape. In the variant according to FIG. 2b, the zig-zag-shape is modified such that sufficient heat-conducting paste is also applied in the corners 30 of the tray bottom 16 illustrated at the bottom of the drawing, by virtue of an additionally applied partial bead 32 extending in the direction of the corners 30. In the variant according to FIG. 2c, the material bead 28 in plan view has an H shape and extends far in the direction of each of the four corners 30 of the tray bottom 16.

Figure 3A:
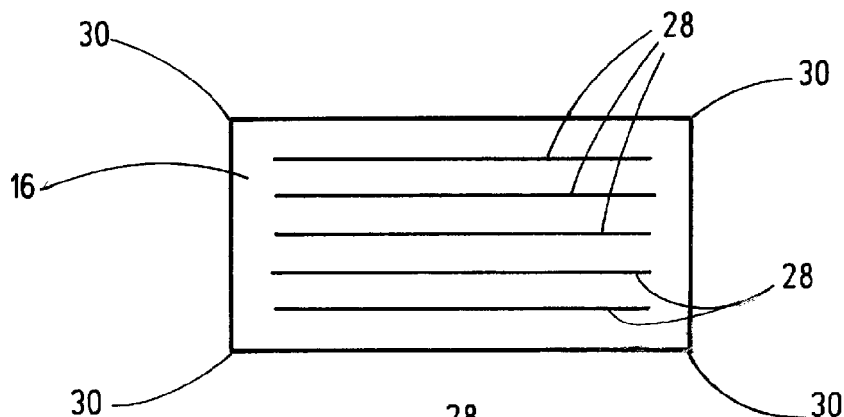
FIG. 3a, 3b, 3c show an arrangement of material beads according to a second exemplary embodiment in plan view and in two elevation views from different viewing directions
Figure 3B:
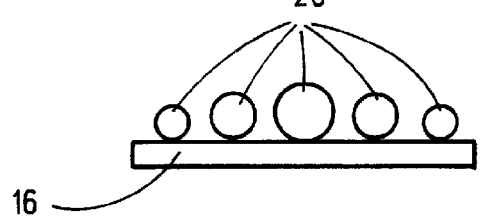
Figure 3C:
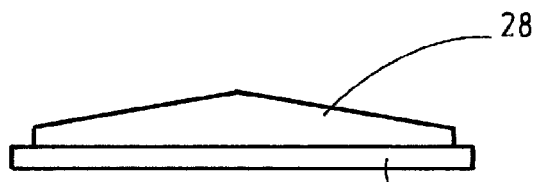

In the exemplary embodiment according to FIG. 3a, 3b, 3c, several material beads 28 extending parallel to one another are applied on the tray bottom 16. As is evident from FIG. 3b, the material bead 28 in the middle has the largest cross section, and the cross section of the material beads 28 decreases steadily in the direction away from the middle material bead 28. As is evident from FIG. 3c, the cross section of the material beads 28 decreases steadily in their longitudinal direction from their middle to the ends.

Figure 4A:
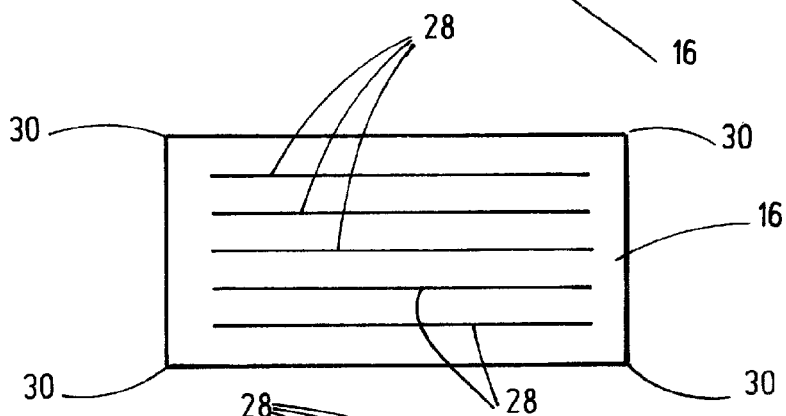
FIG. 4a, 4b, 4c show an arrangement of material beads according to a third exemplary embodiment in plan view and in two elevation views from different viewing directions.
Figure 4B:
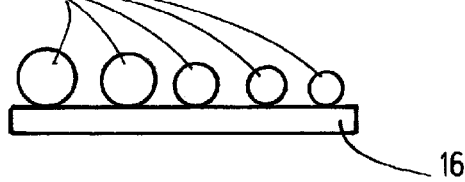
Figure 4C:
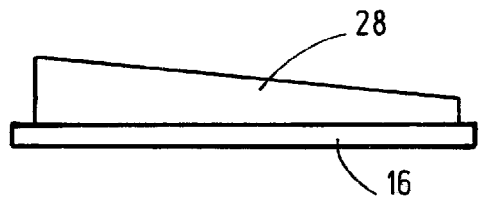

In the exemplary embodiment according to FIG. 4a, 4b, several material beads 28 extending parallel to one another are likewise applied on the tray bottom 16. Here the material bead 28 at the left rim according to FIG. 4b has the largest cross section, and the cross section of the material beads 28 decreases steadily away from this material bead 28; likewise the cross section decreases steadily in longitudinal direction of the material beads 28 from one end to the other (see FIG. 4c).

During insertion of the battery 12 into the battery tray 14, the battery 12 in the embodiment variants according to FIG. 2a, b, c and FIG. 3a, b, c is inserted with battery bottom 26 extending approximately parallel to the tray bottom 16 and heat-conducting paste is displaced from the middle of the tray bottom 16 towards its rims and corners 30 when the material beads 28 are pressed flat. In the embodiment variants according to FIG. 4a, b, c, the battery 12 is inserted into the battery tray 14 in such a way that the battery bottom 26 is first disposed at an acute angle relative to the tray bottom 16 and in the region of the material beads 28 with larger cross section is initially disposed closer to the tray bottom 16, so that heat-conducting paste is displaced from there outwardly in the direction of the middle of the tray bottom 16 and beyond, when the battery bottom 26 is tilted until its extent is ultimately parallel relative to the tray bottom 16. In general, the battery 12 is always inserted into the battery tray 14 in such a way that the battery bottom 26 is seated at first on the heat-conducting paste in its region applied with greater height.

In summary, the following is to be stated: The invention relates to a method for production of a battery arrangement 10, which has a battery tray 14 provided with a tray bottom 16 and a battery 12 accommodated in the battery tray 14, wherein the battery 12 bears on the battery tray 14 at support points spanning a support plane 24 and wherein a heat-conducting paste is applied on the tray bottom 16 and/or on the battery bottom 26 for at least partial filling of a gap between a battery bottom 26 facing the tray bottom 16 and the tray bottom 16 before the insertion of the battery 12 into the battery tray 14. According to the invention, it is provided that a distance between the tray bottom 16 and the support plane 24 is determined at least at several first measurement points before the application of the heat-conducting paste, and that the heat-conducting paste is applied on the tray bottom 16 and/or on the battery bottom 26 in a quantity that is dependent on the determined distances between the tray bottom 16 and the support plane 24.

The invention claimed is:

1. A method for production of a battery arrangement, said method comprising:
   providing a battery tray including a tray bottom, wherein the tray bottom is configured to accommodate a battery, wherein the battery bears on the battery tray at support points spanning a support plane;
   inserting the battery into the battery tray;
   applying a heat-conducting paste on at least one of the tray bottom and the battery bottom for at least partial filling of a gap between a battery bottom facing the tray bottom and the tray bottom before inserting the battery into the battery tray; and
   determining a width of the gap by measuring a first plurality of distances between the tray bottom and the support plane at a plurality of first measurement points on the tray bottom prior to applying the heat-conducting paste;
   calculating a volume of the gap using the plurality of the first measurement points; and
   curing the heat-conducting paste after applying the heat-conducting paste;
   wherein applying the heat-conducting paste further comprises applying the heat-conducting paste in a quantity based on the first plurality of the distances measured at the plurality of the first measuring points and in a volume flow of the heat-conducting paste based on the calculating of the volume.

2. The method according to claim 1, further comprising measuring a second plurality of distances between the battery bottom and the support plane at a plurality of second measurement points prior to the applying of the heat-conducting paste, and wherein the quantity of the heat-conducting paste is based on the first plurality of the distances measured at the plurality of the first measuring points and the second plurality of the distances measured at the plurality of the second measurement points.

3. The method according to claim 2, further comprising assigning, after the insertion of the battery into the battery tray, at least one of the first measurement points to one of the second measurement points.

4. The method according to claim 1, wherein the applying of the heat-conducting paste further comprises surveying a contour of the heat-conducting paste applied on the tray bottom and comparing the contour with calculated target values.

5. The method according to claim 1, further comprising applying the heat-conducting paste in the form of at least one material bead, wherein the at least one material bead does not cover the entire tray bottom or the entire battery bottom, and pressing the at least one material bead flat between the tray bottom and the battery bottom for filling of the gap during insertion of the battery into the battery tray.

6. The method according to claim 5, wherein the at least one material bead has a larger cross section in at least one of the region of the corners of the tray bottom and the region of the corners of the battery bottom.

7. The method according to claim 5, further comprising applying the heat-conducting paste in the form of at least one zig-zag-shaped material bead.

8. The method according to claim 5, further comprising applying the heat-conducting paste in the form of material drops disposed at a distance relative to one another.

9. A method for production of a battery arrangement, said method comprising:
providing a battery tray including a tray bottom, wherein the battery tray with the tray bottom is configured to accommodate a battery, wherein the battery bears on the battery tray at support points spanning a support plane;
inserting the battery into the battery tray;
applying a heat-conducting paste on at least one of the tray bottom and the battery bottom for at least partial filling of a gap between a battery bottom facing the tray bottom and the tray bottom before inserting the battery into the battery tray; and
determining a width of the gap by measuring a first plurality of distances between the tray bottom and the support plane at a plurality of first measurement points on the tray bottom prior to applying the heat-conducting paste;
wherein the determining of the width of the gap further comprises moving a measuring sensor scanning the tray bottom over the tray bottom and along the tray bottom for measurement of the first plurality of the distances; and
wherein applying the heat-conducting paste further comprises applying the heat-conducting paste in a quantity based on the first plurality of the distances measured at the plurality of the first measuring points.

10. The method according to claim 9, further comprising moving the measuring sensor together with an applicator applying the heat-conducting paste onto the tray bottom and scanning the tray bottom before the application of the heat-conducting paste.

11. The method according to claim 10, further comprising varying the volume flow of the heat-conducting paste discharged by the applicator based on the first plurality of the distances measured at the plurality of the first measuring points.

12. The method according to claim 9, further comprising predetermining or measuring and storing the position of the support plane in space, and referring the measured values of the measuring sensor to the position of the support plane in space.

13. A method for production of a battery arrangement, said method comprising:
providing a battery tray including a tray bottom, wherein the tray bottom is configured to accommodate a battery, wherein the battery bears on the battery tray at support points spanning a support plane;
inserting the battery into the battery tray;
applying a heat-conducting paste on at least one of the tray bottom and the battery bottom for at least partial filling of a gap between a battery bottom facing the tray bottom and the tray bottom before inserting the battery into the battery tray; and
determining a width of the gap by measuring a first plurality of distances between the tray bottom and the support plane at a plurality of first measurement points on the tray bottom prior to applying the heat-conducting paste;
wherein applying the heat-conducting paste further comprises applying the heat-conducting paste in a quantity based on the first plurality of the distances measured at the plurality of the first measuring points and in the form of several material beads extending parallel to one another;
wherein the cross section of the material beads increases, decreases, or increases and decreases in at least one of a direction of a longitudinal extent of the material beads and a direction perpendicular to the longitudinal extent of the material beads; and
wherein the material beads do not cover the entire tray bottom or the entire battery bottom, and pressing the material beads flat between the tray bottom and the battery bottom for filling of the gap during insertion of the battery into the battery tray.

14. A method for production of a battery arrangement, said method comprising:
providing a battery tray including a tray bottom, wherein the tray bottom is configured to accommodate a battery, wherein the battery tray has at least two shoulders spaced from one another and provided with support points, wherein the battery bears on the battery tray with support surfaces on an underside of the battery at the support points spanning a support plane;
inserting the battery into the battery tray;
applying a heat-conducting paste on at least one of the tray bottom and the battery bottom for at least partial filling of a gap between a battery bottom facing the tray bottom and the tray bottom before inserting the battery into the battery tray; and
determining a width of the gap by measuring a first plurality of distances between the tray bottom and the support plane at a plurality of first measurement points on the tray bottom prior to applying the heat-conducting paste;
wherein applying the heat-conducting paste further comprises applying the heat-conducting paste in a quantity based on the first plurality of the distances measured at the plurality of the first measuring points.

\* \* \* \* \*